(12) United States Patent
Peck

(10) Patent No.: US 10,703,157 B2
(45) Date of Patent: Jul. 7, 2020

(54) SQUEEZE-WELDED SPRING SEAT

(71) Applicant: Mahindra N.A. Tech Center, Auburn Hills, MI (US)

(72) Inventor: David E. Peck, Rochester Hills, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 199 days.

(21) Appl. No.: 15/955,273

(22) Filed: Apr. 17, 2018

(65) Prior Publication Data

US 2019/0315176 A1   Oct. 17, 2019

(51) Int. Cl.
| | | |
|---|---|---|
| *B60G 11/113* | (2006.01) | |
| *B60G 21/05* | (2006.01) | |
| *B60G 21/00* | (2006.01) | |
| *B60G 11/08* | (2006.01) | |
| *B60G 9/00* | (2006.01) | |

(52) U.S. Cl.
CPC ............ *B60G 11/113* (2013.01); *B60G 11/08* (2013.01); *B60G 21/005* (2013.01); *B60G 21/05* (2013.01); *B60G 9/003* (2013.01)

(58) Field of Classification Search
CPC ....... B60G 11/113; B60G 9/003; B60G 11/08; B60G 21/005; B60G 21/05; B60G 11/04; B60G 2204/4306; B60G 2204/121; B60G 2202/112

See application file for complete search history.

(56) References Cited

U.S. PATENT DOCUMENTS

| | | | |
|---|---|---|---|
| 1,385,483 A | | 7/1921 | Carter |
| 4,375,896 A | * | 3/1983 | Barnes ..................... B60G 5/03 280/124.1 |
| 5,328,159 A | * | 7/1994 | Kaufman .............. B60G 11/113 267/52 |
| 5,476,251 A | | 12/1995 | Moses et al. |
| 5,921,570 A | | 7/1999 | Lie |
| 5,950,971 A | | 9/1999 | Koumbis et al. |

(Continued)

FOREIGN PATENT DOCUMENTS

JP   2004353699 A   12/2004

OTHER PUBLICATIONS

International Search Report issued in PCT/US2019/026949 dated Jul. 30, 2019.

(Continued)

*Primary Examiner* — Karen Beck
(74) *Attorney, Agent, or Firm* — Harness, Dickey & Pierce, P.L.C.

(57) ABSTRACT

A suspension interconnection assembly for a vehicle adapted to move along a surface of the ground includes an axle housing and a spring seat. The spring seat includes a pocket defined by a U-shaped saddle having a bottom wall that extends between a first leg and a second leg. The first and second legs include claw portions that are adapted to engage an upper portion of the axle housing. Welds secure the first and second claw portions to the axle housing so that areas of the axle housing adjacent the welds are in a state of residual tensile stress based on forming. The position of the welds provides a stress cancelling effect upon application of the load to the axle housing in a direction perpendicular to the surface of the ground.

16 Claims, 4 Drawing Sheets

(56) References Cited

U.S. PATENT DOCUMENTS

| | | | |
|---|---|---|---|
| 6,032,967 A * | 3/2000 | Ogoniek | B60B 35/08 |
| | | | 280/124.1 |
| 6,508,482 B2 | 1/2003 | Pierce et al. | |
| 8,029,008 B2 | 10/2011 | Cortez et al. | |
| 8,528,923 B2 | 9/2013 | Wakefield et al. | |
| 9,186,947 B2 * | 11/2015 | Kopplow | B60G 11/113 |
| 9,327,571 B2 | 5/2016 | Pierce et al. | |
| 2005/0253351 A1 * | 11/2005 | Pan | B60G 9/003 |
| | | | 280/124.116 |
| 2005/0269795 A1 * | 12/2005 | McKenzie | B60B 35/04 |
| | | | 280/124.11 |
| 2007/0120339 A1 * | 5/2007 | Barber | B21D 53/88 |
| | | | 280/93.512 |
| 2015/0165851 A1 | 6/2015 | Dilworth et al. | |
| 2016/0137015 A1 * | 5/2016 | Drewes | B60G 7/008 |
| | | | 280/124.128 |
| 2018/0229567 A1 * | 8/2018 | Keeler | B60G 11/04 |

OTHER PUBLICATIONS

Written Opinion issued in related PCT/US2019/026949 dated Jul. 30, 2019.

* cited by examiner

SQUEEZE-WELDED SPRING SEAT

FIELD

The present disclosure relates in general to vehicle axle assemblies and the interconnection between the vehicle axle assembly and a vehicle suspension. More particularly, a spring seat is configured and fixed to the vehicle axle to provide a stress cancelling effect and increase the fatigue life of the vehicle axle.

BACKGROUND

This section provides background information related to the present disclosure which is not necessarily prior art.

Many vehicles are equipped with structures identified as axle assemblies for supporting rotatable wheels. Some axle assemblies, such as drive axle assemblies, include a number of rotatable components operable to transmit power from an engine of the vehicle to the wheels. The rotatable components of the axle assembly are typically enclosed in an axle housing. The axle housing may include a central enlarged or banjo portion for receipt of a rotatable ring and gear assembly as well as a differential mechanism. The axle housing typically includes a pair of outwardly extending tubular portions integrally formed with the central portion. Previously known examples of axle housings include hollow cylindrical steel tubes that are fixed to the central portion by welding or other mechanical means. Other axle housings may be formed by interconnecting two "C" shaped middle members to one another by a transversely extending set of welds.

The axle housing typically also includes a pair of mounting flanges fixed to outboard ends of the outwardly extending tubes to provide mounting provisions for components such as brakes. It is also common for a seat comprised of one or more individual components to be fixed to the axle housing tubes for interconnecting the axle assembly and a vehicle body by a suspension system that includes springs. Springs have been useful to interconnect a vehicle frame with an axle housing to isolate the vehicle body/frame from loads imparted to the wheels as the vehicle travels.

While previously implemented spring seats may have satisfactorily functioned in the past, strides may be made to improve the robustness of the axle assembly and suspension by minimizing stress concentrations imparted by the design and manufacturing processes such as welding. Accordingly, a need exists for an improved spring seat and axle assembly manufacturing process for providing a robust axle assembly exhibiting increased fatigue life.

SUMMARY

This section provides a general summary of the disclosure, and is not a comprehensive disclosure of its full scope or all of its features.

In accordance with an aspect of the subject disclosure, a suspension interconnection assembly for a vehicle adapted to move along a surface of the ground is provided. The suspension interconnection assembly includes an axle housing and a spring seat. The axle housing has an upper portion and a lower portion. The spring seat includes a substantially planar base. The spring seat further includes a pocket that is integrally formed with the base. The pocket is defined by a U-shaped saddle having a bottom wall. The bottom wall extends between a first leg and a second leg. The first leg and the second leg are spaced apart from the axle housing to allow the axle housing to be positioned within the pocket. A first claw portion extends from the first leg and a second claw portion extends from the second leg. The first leg and the second leg are operable to deform to an extent that the first and second claw portions engage the upper portion of the axle housing. A first weld secures the first claw portion to the upper portion of the axle housing. A second weld secures the second claw portion to the upper portion of the axle housing. Areas of the axle housing that are adjacent the first and second welds are in a state of residual tensile stress based on forming the first and second welds. The position of the first and second welds provides a stress cancelling effect upon application of a load to the axle housing in a direction perpendicular to the surface of the ground.

In another aspect of the subject disclosure, a suspension interconnection assembly for a vehicle adapted to move along a surface of the ground is provided. The suspension interconnection assembly includes an axle housing and a spring seat. The spring seat includes a pocket defined by a U-shaped saddle. The saddle has a bottom wall extending between a first leg and a second leg. The spring seat also includes a base integrally formed with the pocket. The first leg and the second leg are spaced apart from the axle housing to allow the axle housing to be positioned within the pocket. A top surface of the bottom wall of the pocket and the bottom surface of the base of the spring seat define a pocket angle. The pocket angle is oblique.

In still another aspect of the subject disclosure, a method of assembling a suspension interconnection assembly is provided. The method includes placing an axle housing into a pocket of a spring seat, the pocket being defined by a U-shaped saddle having a bottom wall extending between a first leg and a second leg. The method further includes squeezing a first leg and a second leg of the spring seat toward the axle housing to engage an outer surface of an upper portion of the axle housing. The upper portion of the axle housing is in compression when a vehicle load is on the axle housing. The method also includes welding the first leg and the second leg to an outer surface of the upper portion of the axle housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
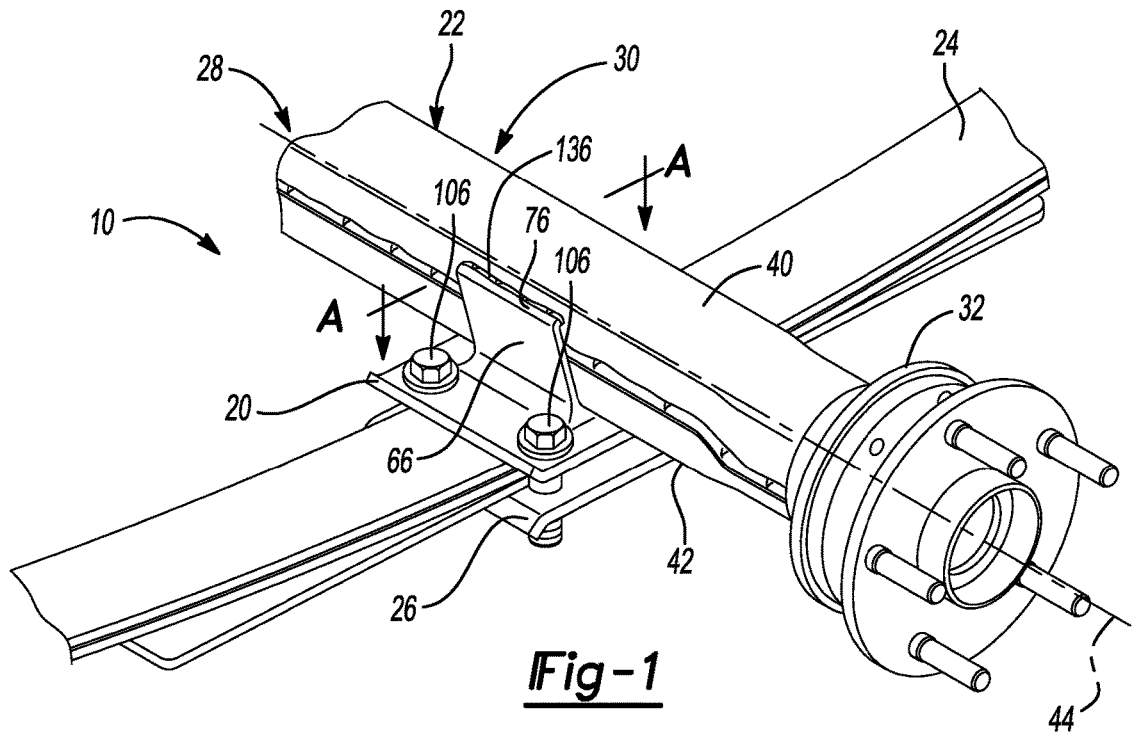
FIG. 1 is a partial perspective view of a suspension interconnection assembly including a spring seat, an axle housing, and a leaf spring constructed in accordance with the subject disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
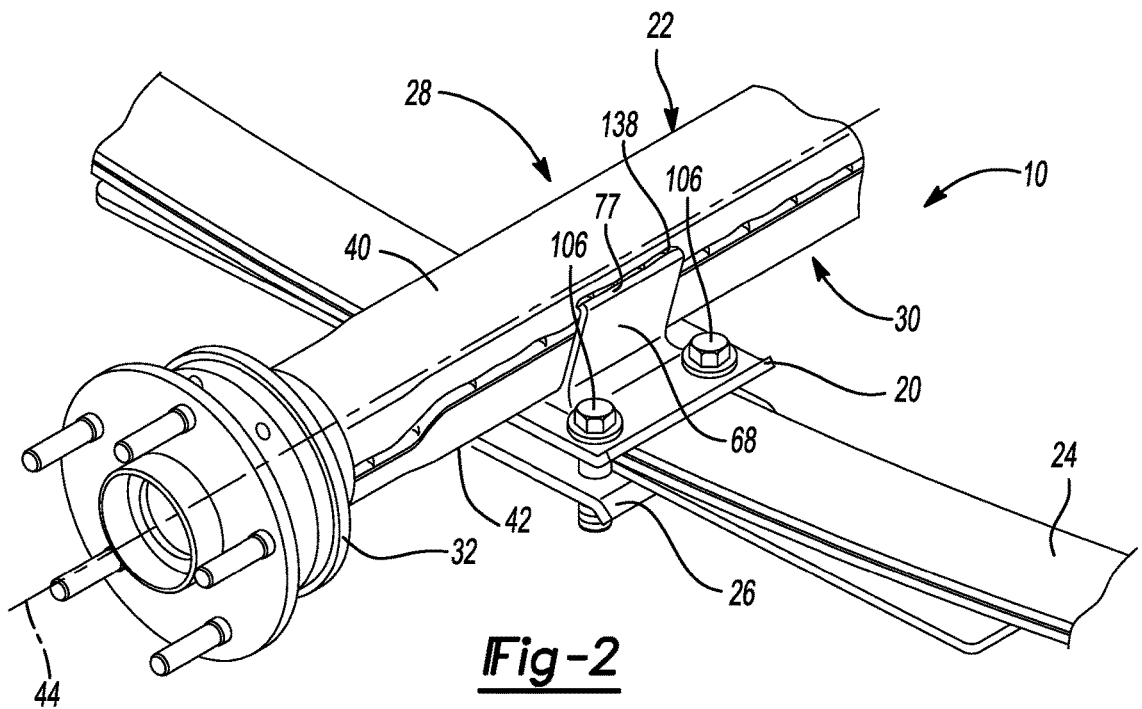
FIG. 2 is another perspective view of the exemplary suspension interconnection assembly shown in FIG. 1.
Figure 3:
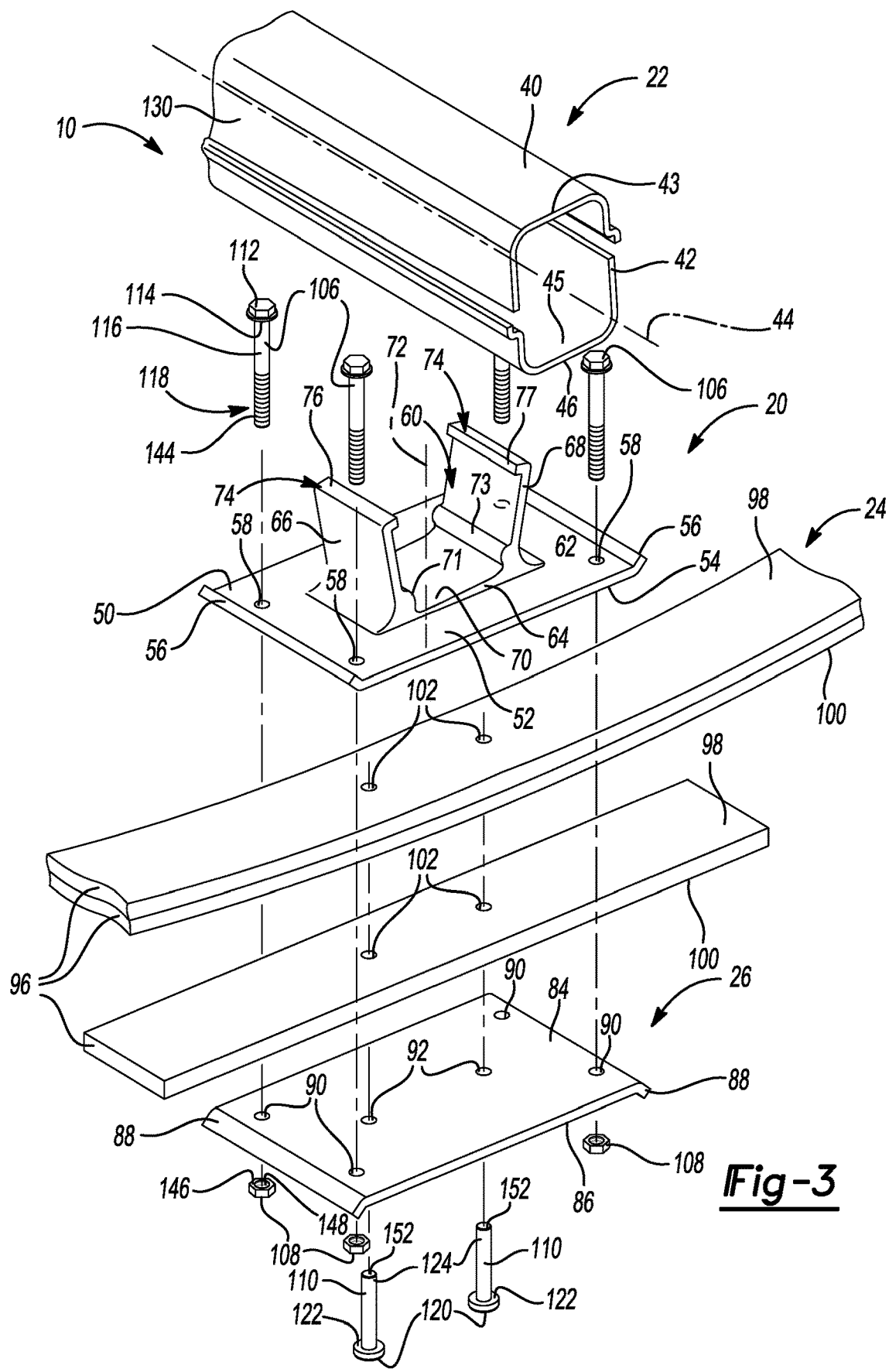
FIG. 3 is an exploded view of the exemplary suspension interconnection assembly shown in FIG. 1.

With reference to FIG. 1, it should generally be appreciated that spring seats may be used as part of a suspension interconnection assembly 10 in a vehicle operable to move along a surface of the ground. Such vehicles may include trucks, light trucks, and automobiles. An example suspension interconnection assembly according to the principles of the present disclosure is shown in FIGS. 1-3. The suspension interconnection assembly 10 disclosed herein generally includes a spring seat 20, an axle housing 22, a leaf spring 24, and a clamp plate 26. The leaf spring 24 is clamped between the spring seat 20 and the clamp plate 26, as described below.

The axle housing 22 has a first side 28 and a second side 30. When the axle housing 22 is assembled to a vehicle, the first side 28 is oriented toward the rear of the vehicle and the second side 30 is oriented toward the front of the vehicle, which typically includes the engine and the transmission (not shown). The axle housing 22 is hollow. The axle housing 22 may be connected to a mounting flange 32 for attaching components such as brakes.

Figure 4:
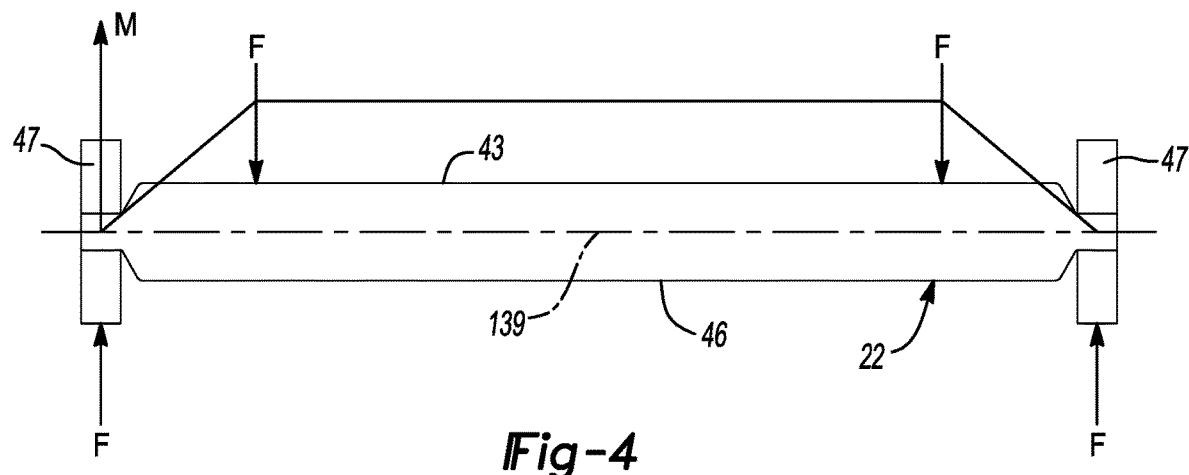
FIG. 4 is a free body and bending moment diagram of a representative axle.

The axle housing 22 includes an upper half or upper portion 40, a lower half or lower portion 42, and a central longitudinal axis 44. The upper portion 40 is welded to the lower portion 42. The upper portion 40 includes an upper surface 43. The lower portion comprises a bottom wall 45 including a bottom surface 46. As shown in FIG. 4, the mass of the vehicle body applies forces F on upper portion 40 on or near upper surface 43. Vehicle wheels 47 impart reaction loads F to axle housing 22. This static loading configuration applies a bending moment in the axle housing 22. The bending moment induces compressive stresses in the upper surface 43 of the axle housing 22 and tensile stresses in the bottom surface 46 of the axle housing 22.

The spring seat 20 includes a substantially planar base 50 having a top surface 52, a bottom surface 54, and opposing side edges 56 that form an angle with the top surface 52. The base 50 further comprises a plurality of first clamp apertures 58 extending between the top surface 52 and the bottom surface 54. The plurality of first clamp apertures 58 may comprise four apertures. Each of the first clamp apertures 58 of the plurality is disposed near a respective corner of the base 50.

The spring seat 20 further includes a pocket 60 defined by a generally U-shaped saddle 62 having a bottom wall 64 that is integrally formed with the base 50. The bottom wall 64 interconnects a first leg 66 and a second leg 68. The bottom wall includes an upper surface 70 that is sized and shaped to complement the bottom surface 46 of the axle housing 22.

A first thrust pad 71 is integrally formed with first leg 66 and protrudes inwardly. A second thrust pad 73 is integrally formed with second leg 68 and protrudes inwardly toward first thrust pad 71.

The spring seat 20 includes a vertical axis 72 that is perpendicular to the base 50. The first leg 66 extends from the bottom wall 64 of the saddle 62 at a first angle measured from the vertical axis 72 in an unassembled state. The first angle is oblique. The second leg 68 extends from the bottom wall 64 of the saddle at a second angle measured from the vertical axis 72 in an unassembled state. The second angle is oblique. The first angle and the second angle may be equal and opposite. The first leg 66 extends at an oblique angle relative to the second leg such that distal ends 74 of the first and second legs 66, 68 are spaced apart a greater distance than proximate ends of the first and second legs 66, 68.

The first leg 66 and the second leg 68 are integrally formed with the bottom wall 64. The first leg 66 and the second leg 68 include distal ends 74 having opposing first and second claw portions 76, 77. The first and second claw portions 76, 77 extend inward and may form right angles with the respective first leg 66 or second leg 68; however, other angles are contemplated within the scope of the present disclosure. In an unassembled state, the first leg 66 and the second leg 68 are spaced apart from the axle housing 22 to allow the axle housing to be positioned within the pocket 60, as best shown in FIG. 4. Bottom surface 46 is spaced apart from upper surface 70 of pocket 60 as first thrust pad 71 and second thrust pad 73 engage lower portion 42 of axle housing 22.

With continued reference to FIG. 4, the upper surface 70 of the bottom wall 64 of the saddle 62 forms a third angle, or saddle angle, with the top surface 52 of the base 50. The saddle angle is oblique. The saddle angle may be greater than or equal to about 10° and less than or equal to about 20°, and optionally about 15°. The spring seat 20 is positioned so that the vertex of the saddle angle is closest to a rear of the vehicle and the saddle angle opens up toward a front of the vehicle so that the upper surface 70 of the saddle is angled upward toward the front of the vehicle.

Returning to FIG. 3, the clamp plate 26 is substantially planar. The clamp plate 26 includes a top surface 84, a bottom surface 86, and opposing side edges 88 that form an angle with the top surface 84. A plurality of second clamp apertures 90 extend between the top surface 84 and the bottom surface 86. The quantity of second clamp apertures 90 in the plurality is equal to the number of first clamp apertures 58 in the base 50 of the spring seat 20, and may be four. The four second clamp apertures 90 are located in the four corners of the clamp plate 26, respectively. The clamp plate 26 further comprises a plurality of first leaf spring apertures 92 extending between the top surface 84 and the bottom surface 86. The plurality of first leaf spring apertures 92 may comprise two apertures.

The leaf spring 24 includes a plurality of stacked leaves 96. Each leaf 96 of the plurality includes a top surface 98, a bottom surface 100, and a plurality of second leaf spring apertures 102. The quantity of second leaf spring apertures 102 in the plurality is equal to the number of first leaf spring apertures 92 in the clamp plate 26, and may be two.

The suspension interconnection assembly 10 further comprises a plurality of threaded bolts 106, a plurality of threaded nuts 108, and a plurality of leaf spring bolts 110. Each threaded bolt 106 of the plurality includes a head 112 having a bottom surface 114 and a shaft 116 having a threaded end 118. The quantity of threaded bolts 106 in the plurality equals the number of first clamp apertures 58 in the plurality of first clamp apertures, and may be four. Each leaf spring bolt 110 of the plurality includes a head 120 having a bottom surface 122 and a shaft 124.

Figure 7:
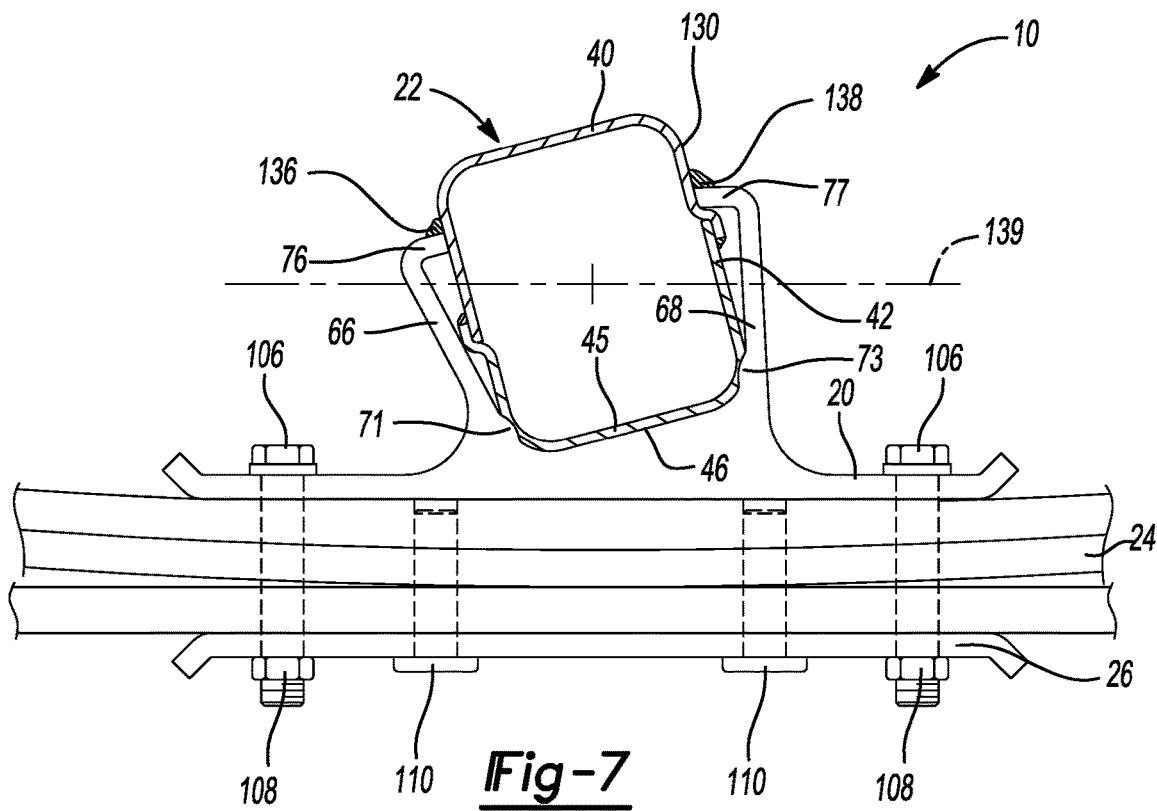
FIG. 7 is a partial front cross-sectional view of the exemplary suspension interconnection assembly shown FIG. 1, taken along section line A-A of FIG. 1, in a fully-assembled state.

In an assembled state as depicted in FIG. 7, the leaf spring 24 is disposed between the spring seat 20 and the clamp plate 26. The bottom surface 54 of the base 50 of the spring seat 20 at least partially engages the top surface 98 of the leaf spring 24. The bottom surface 100 of the leaf spring 24 at least partially engages the top surface 84 of the clamp plate 26. Each threaded bolt 106 of the plurality extends through a respective first clamp aperture 58 of the base 50 and a respective second clamp aperture 90 of the clamp plate 26 so that the bottom surface 114 of the head 112 of the threaded bolt 106 engages the top surface 52 of the base 50 of the spring seat 20. Each nut 108 of the plurality engages a respective threaded bolt 106 to clamp the leaf spring 24 between the spring seat 20 and the clamp plate 26.

In the assembled state, the leaves 96 of the plurality of stacked leaves of the leaf spring 24 are clamped together by the plurality of leaf spring bolts 110. Each leaf spring bolt 110 of the plurality extends through a respective first leaf spring aperture 92 and a respective second leaf spring aperture 102 so that the bottom surface 122 of the head 120 of the leaf spring bolt 110 engages the bottom surface 86 of the clamp plate 26.

The axle housing 22 is seated in the pocket 60 of the spring seat 20 in the assembled state so that the bottom surface 46 of the axle housing 22 engages the complementary upper surface 70 of the pocket 60. Thus, the axle housing 22 is seated at the saddle angle so that it is angled upward toward the front of the vehicle. That is, the first side 28 of the axle housing 22 is lower than the second side 30 of the axle housing. This orientation facilitates proper alignment between the axle housing and the transmission.

The first leg 66 and the second leg 68 are operable to deform to an extent that the first claw portion 76 and the second claw portion 77 engage the axle housing 22 in the assembled state. The spring seat 20 may comprise ductile cast iron. The first and second legs 66, 68 are adapted to induce compressive stress in the bottom wall 45 of the lower portion 42 of the axle housing 22. As first and second thrust pads 71, 73 are driven into contact with lower portion 42, a compressive load is generated along the bottom surface 46 of the axle housing 22. As previously discussed, vehicle body load induces a bending moment in the axle housing 22 that causes tensile stress along bottom surface 46 of the axle housing 22. The compressive stress induced by the first and second thrust pads 71, 73 provides a stress cancelling effect to tensile loads along bottom surface 46 induced by loading axle housing 22 with the weight of the vehicle body. More specifically, the compressive stress of the assembly technique counteracts the tensile stress caused by the bending moment.

In the assembled state, an outer surface 130 of the upper portion 40 of the axle housing 22 and the first claw portion 76 form a first seam 132. The outer surface 130 of the upper portion 40 of the axle housing 22 and the second claw portion 77 form a second seam 134. A first full fillet weld 136 is disposed along the first seam 132 to secure the first claw portion 76 to the outer surface 130 of the upper portion 40 of the axle housing 22. A second full fillet weld 138 is disposed along the second seam 134 to secure the second claw portion 77 to the outer surface 130 of the upper portion 40 of the axle housing 22. Areas of the axle housing adjacent the first and second welds 136, 138 are in a state of residual tensile stress from forming first and second welds 136, 138 and any springback tendencies of first leg 66 and second leg

68. As shown in FIGS. 4 and 7, portions of axle housing 22 located above neutral axis 139 are in a state of compressive stress due to the static loading and bending moment from the vehicle weight. Compressive stresses induced by the bending moment counteract the tensile stress adjacent the first and second welds 136, 138.

Figure 5:
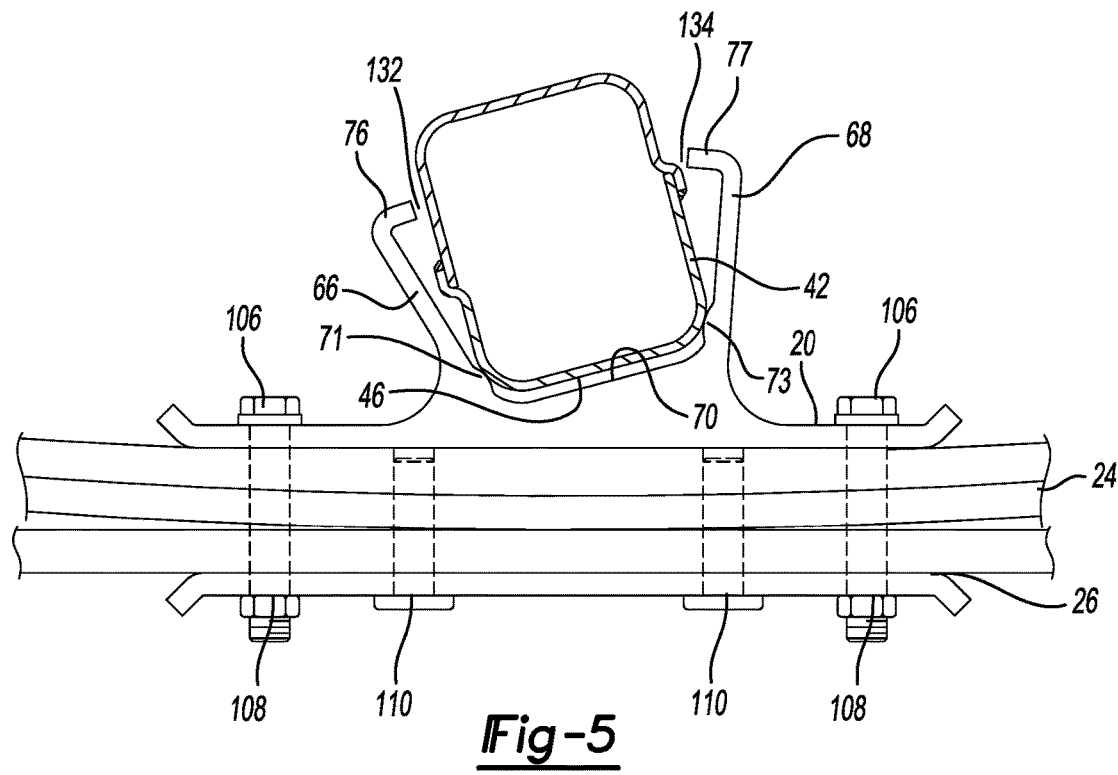
FIG. 5 is a partial front cross-sectional view of the exemplary suspension interconnection assembly shown in FIG. 1, taken along section line A-A of FIG. 1, in a first partially-assembled state.
Figure 6:
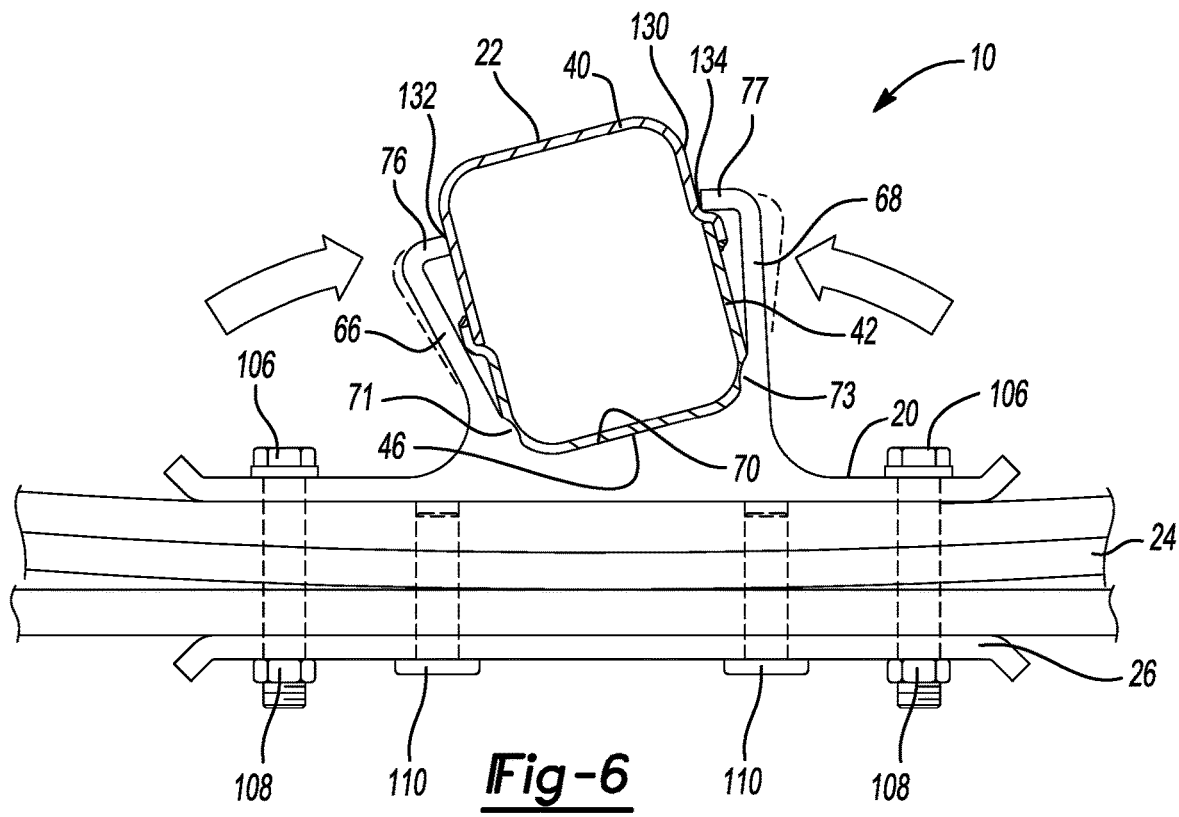
FIG. 6 is a partial front cross-sectional view of the exemplary suspension interconnection assembly shown in FIG. 1, taken along section line A-A of FIG. 1, in a second partially-assembled state.

Referring now to FIGS. 4-6, a method of assembling the suspension interconnection assembly 10 of FIGS. 1-3 is provided. The method includes placing the axle housing 22 in the pocket 60 of the spring seat 20 so that the bottom surface 46 of the axle housing engages first thrust pad 71 and second thrust pad 73. As indicated by the arrows in FIG. 5, the first leg 66 and the second leg 68 of the spring seat 20 are squeezed together so that the first and second claw portions 76, 77 engage an outer surface 130 of the upper portion 40 of the axle housing 22. Squeezing the first leg 66 and the second leg 68 toward the axle housing decreases the first angle and the second angle, thereby moving the first and second thrust pads 71, 73 closer to one another while maintaining contact with lower portion 42. A compressive stress exists in the bottom wall 45 of the lower portion 42 of the axle housing 22.

The method further includes aligning the plurality of first leaf spring apertures 92 of the clamp plate 26 with the plurality of second leaf spring apertures 102 of the leaf spring 24. The method further includes concurrently aligning the plurality of first clamp apertures 58 of the leaf spring 20 with the plurality of second clamp apertures 90 of the clamp plate 26. Next, each shaft 116 of a threaded bolt 106 of the plurality is inserted into a respective first clamp aperture 58 and a respective second clamp aperture 90 so that the bottom surface 114 of the head 112 engages the top surface 52 of the base 50 of the spring seat 20. Each nut 108 of the plurality is screwed onto a respective threaded bolt 106 so that a plurality of male threads 144 of the threaded end 118 of the threaded bolt 106 engage a plurality of female threads 146 of the nut 108. A top surface 148 of each nut 108 of the plurality engages the bottom surface 86 of the clamp plate 144.

Each shaft 124 of a leaf spring bolt 110 of the plurality is inserted into a respective first leaf spring aperture 92 and a respective second leaf spring aperture 102 so that the bottom surface 122 of the head 120 of the leaf spring bolt 110 engages the bottom surface 86 of the clamp plate 26. An end 152 of the shaft 124 of the leaf spring bolt 110 engages the bottom surface 54 of the base 50 of the spring seat 20.

With reference to FIG. 6, the first and second claw portions 76, 77 are welded to the outer surface 130 of the upper portion 40 of the axle housing 22. The welding procedure may include applying tack welds along the first seam 132 and the second seam 134 where the first and second claw portions 76, 77 engage the outer surface 130. First and second full fillet welds 136, 138 may subsequently be applied along the first seam 132 and the second seam 134, respectively.

The method may further include forming the spring seat 20 from a ductile cast iron prior to assembling to the axle housing 22, leaf spring 24, and clamp plate 26.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A suspension interconnection assembly for a vehicle adapted to move along a surface of the ground, the suspension interconnection assembly comprising:
    an axle housing having an upper portion and a lower portion; and
    a spring seat comprising:
        a base that is substantially planar;
        a pocket integrally formed with the base, the pocket being defined by a U-shaped saddle having a bottom wall, the bottom wall extending between a first leg and a second leg, wherein the first leg and the second leg are spaced apart from the axle housing to allow the axle housing to be positioned within the pocket;
        a first claw portion extending from the first leg and a second claw portion extending from the second leg, wherein the first leg and the second leg are operable to deform to an extent that the first and second claw portions engage the upper portion of the axle housing; and
        a first weld securing the first claw portion to the upper portion of the axle housing and a second weld securing the second claw portion to the upper portion of the axle housing, wherein:
    areas of the axle housing adjacent the first and second welds are in a state of residual tensile stress based on forming the first and second welds, and
    the position of the first and second welds provides a stress cancelling effect upon application of a load to the axle housing in a direction perpendicular to the surface of the ground.

2. The suspension interconnection assembly of claim 1, wherein the first leg and the second leg are adapted to induce compressive stress in a bottom wall of the lower portion of the axle housing.

3. The suspension interconnection assembly of claim 2, wherein the compressive stress in the bottom wall of the lower portion of the axle housing provides a stress cancelling effect upon application of a load to the axle housing in a direction perpendicular to the surface of the ground.

4. The suspension interconnection assembly of claim 2, wherein the first leg includes a protruding first thrust tab and the second leg includes a protruding second thrust tab, the first and second thrust tabs being driven into engagement with the axle housing to apply a compressive stress to a bottom wall of the axle housing.

5. The suspension interconnection assembly of claim 1, wherein a top surface of the bottom wall of the pocket and a bottom surface of the base of the spring seat define a pocket angle and the pocket angle is oblique.

6. The suspension interconnection assembly of claim 5, wherein the pocket angle is greater than or equal to about 10° and less than or equal to about 20°.

7. The suspension interconnection assembly of claim 1, wherein the spring seat comprises ductile cast iron.

8. A suspension interconnection assembly for a vehicle, the suspension interconnection assembly comprising:
    an axle housing; and
    a spring seat, the spring seat comprising a pocket defined by a U-shaped saddle having a bottom wall, the bottom wall extending between a first leg and a second leg and a base integrally formed with the pocket, wherein:
        the first leg and the second leg are spaced apart from the axle housing to allow the axle housing to be positioned within the pocket, and a top surface of the bottom wall of the pocket and the bottom surface of the base of the spring seat define a pocket angle and the pocket angle is oblique, wherein the pocket angle is about 15°.

9. The suspension interconnection assembly of claim 8, wherein:
the first leg includes a first claw portion and the second leg includes a second claw portion, and
the first leg and the second leg are adapted to induce compressive stress in a lower portion of the axle housing upon mechanical deformation of the first and second legs to engage the first and second claw portions with the axle housing and provide a stress cancelling effect to a tensile load on the axle housing.

10. The suspension interconnection assembly of claim 9, further comprising a first weld securing the first claw portion to an upper portion of the axle housing and a second weld securing the second claw portion to the upper portion of the axle housing, wherein:
areas of the axle housing adjacent the first and second welds are in a state of residual tensile stress based on weld formation; and
the position of the first and second welds provides a stress cancelling effect upon application of a load to the axle housing in a direction perpendicular to the surface of the ground.

11. A method of assembling a suspension interconnection assembly for a vehicle, the method comprising:
placing an axle housing into a pocket of a spring seat, the pocket being defined by a U-shaped saddle having a bottom wall extending between a first leg and a second leg;
squeezing a first leg and a second leg of the spring seat toward the axle housing to engage an outer surface of an upper portion of the axle housing, wherein the upper portion of the axle housing is in compression when a vehicle load is on the axle housing; and
welding the first leg to an outer surface of the upper portion of the axle housing and welding a second leg to an outer side surface of the upper portion of the axle housing;
wherein the squeezing induces compression in a bottom wall of a lower portion of the axle housing between the first leg and the second leg of the spring seat; and
wherein the first leg includes a first thrust tab and the second leg includes a second thrust tab, the method further including drivingly engaging the first thrust tab and the second thrust tab with the axle housing to load the bottom wall in compression.

12. The method of claim 11, wherein welding comprises:
forming a first full fillet weld along a first seam between the first leg and the outer surface of the upper portion of the axle housing; and
forming a second full fillet weld along a second seam between the second leg and the outer surface of the upper portion of the axle housing.

13. The method of claim 12, wherein welding further comprises:
forming at least one first tack weld along the first seam; and
forming at least one second tack weld along the second seam.

14. The method of claim 11, further comprising casting the spring seat from a ductile cast iron.

15. The method of claim 11, further comprising placing at least one leaf spring between a bottom surface of the spring seat and a top surface of a clamp plate.

16. The method of claim 15, further comprising:
aligning a plurality of first apertures in the spring seat with a respective plurality of second apertures in the clamp plate;
inserting a plurality of threaded bolts through the respective plurality of first apertures and respective plurality of second apertures; and
threading a plurality of nuts onto respective threaded bolts to clamp the at least one leaf spring between the spring seat and the clamp plate.

* * * * *